(12) United States Patent
Lai

(10) Patent No.: US 6,199,799 B1
(45) Date of Patent: Mar. 13, 2001

(54) PARACHUTE DEVICE FOR HELICOPTERS

(75) Inventor: Hsing-Hsiung Lai, Taichung (TW)

(73) Assignee: Light's American Sportscopter Inc. (TW)

( * ) Notice: Subject to any disclaimer, the term of this patent is extended or adjusted under 35 U.S.C. 154(b) by 0 days.

(21) Appl. No.: 09/400,379

(22) Filed: Sep. 21, 1999

(51) Int. Cl.⁷ .................................................. B64D 17/00
(52) U.S. Cl. ...................... 244/139; 244/147; 244/17.15
(58) Field of Search ............................... 244/139, 138 R, 244/17.15, 147

(56) References Cited

U.S. PATENT DOCUMENTS

| | | | | |
|---|---|---|---|---|
| 2,549,407 | * | 4/1951 | Apostolescu | 244/139 |
| 2,812,147 | * | 11/1957 | Trabucco | 244/139 |
| 3,138,348 | * | 6/1964 | Stahmer | 244/17.15 |
| 3,436,037 | * | 4/1969 | Stanley | 244/147 |
| 4,709,881 | * | 12/1987 | Rafikian et al. | 244/17.15 |

* cited by examiner

Primary Examiner—J. Woodrow Eldred
(74) Attorney, Agent, or Firm—Fish & Richardson

(57) ABSTRACT

A parachute device for a helicopter includes a canopy confining case having a stationary casing part, and a removable casing part mounted removably on the stationary casing part. The stationary and removable casing parts cooperatively form a compartment to receive a parachute canopy that has a release cord connected to the removable casing part, and a suspension line unit. An anchoring line has one end that extends into the canopy confining case and that is coupled to the suspension line unit of the parachute canopy. A rocket member includes a launch tube mounted on the stationary casing part externally of the compartment, and a rocket disposed in the launch tube and connected to the removable casing part. The rocket is capable of propelling from the launch tube when ignited. An ignition control line has a first end connected to the rocket member, and a second end provided with an ignition unit that is operable so as to ignite the rocket.

4 Claims, 4 Drawing Sheets

PARACHUTE DEVICE FOR HELICOPTERS

BACKGROUND OF THE INVENTION

1. Field of the Invention

The invention relates to a parachute, more particularly to a parachute device that can assist in safe landing of a helicopter.

2. Description of the Related Art

Helicopters are in wide use in view of their vertical takeoff and landing capabilities, which result in increased safety and which eliminate the need for long runways. However, conventional helicopters are not provided with equipment to assist in safe landing thereof. Thus, destruction of property and loss of lives are commonly encountered in case of an emergency situation, such as power loss or breakdown while the helicopter is in flight.

SUMMARY OF THE INVENTION

Therefore, the object of the present invention is to provide a parachute device that is adapted to be mounted on a rotor drive shaft of a helicopter to assist in safe landing of the same.

According to the present invention, a parachute device is adapted for use with a helicopter having a tubular rotor drive shaft, and comprises:

- an elongate hollow mounting member having top and bottom ends, and a hole that extends longitudinally through the top and bottom ends, the bottom end of the mounting member being adapted to be mounted securely to the helicopter, the mounting member being adapted to be extended rotatably inside the rotor drive shaft such that the top end of the mounting member projects upwardly and outwardly of the rotor drive shaft;
- a canopy confining case having a stationary casing part mounted securely on the top end of the mounting member, and a removable casing part mounted removably on the stationary casing part, the stationary and removable casing parts cooperatively forming a compartment;
- a parachute canopy received inside the compartment of the canopy confining case, the parachute canopy having a release cord connected to the removable casing part, and a suspension line unit;
- an anchoring line extending through the hole in the mounting member and having a first end that is adapted to be fixed to the helicopter and a second end that extends into the canopy confining case and that is coupled to the suspension line unit of the parachute canopy;
- a rocket member including a launch tube mounted on the stationary casing part externally of the compartment, and a rocket disposed in the launch tube and connected to the removable casing part, the rocket being capable of propelling from the launch tube when ignited; and
- an ignition control line extending through the hole in the mounting member and having a first end connected to the rocket member and a second end provided with an ignition unit that is operable so as to ignite the rocket.

When the rocket propels from the launch tube, the removable casing part will be removed from the stationary casing part, thereby allowing the removable casing part to pull the release cord and open the parachute canopy. The parachute canopy is adapted to support the weight of the helicopter when opened via the anchoring line that interconnects the suspension line unit of the parachute canopy and the helicopter.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
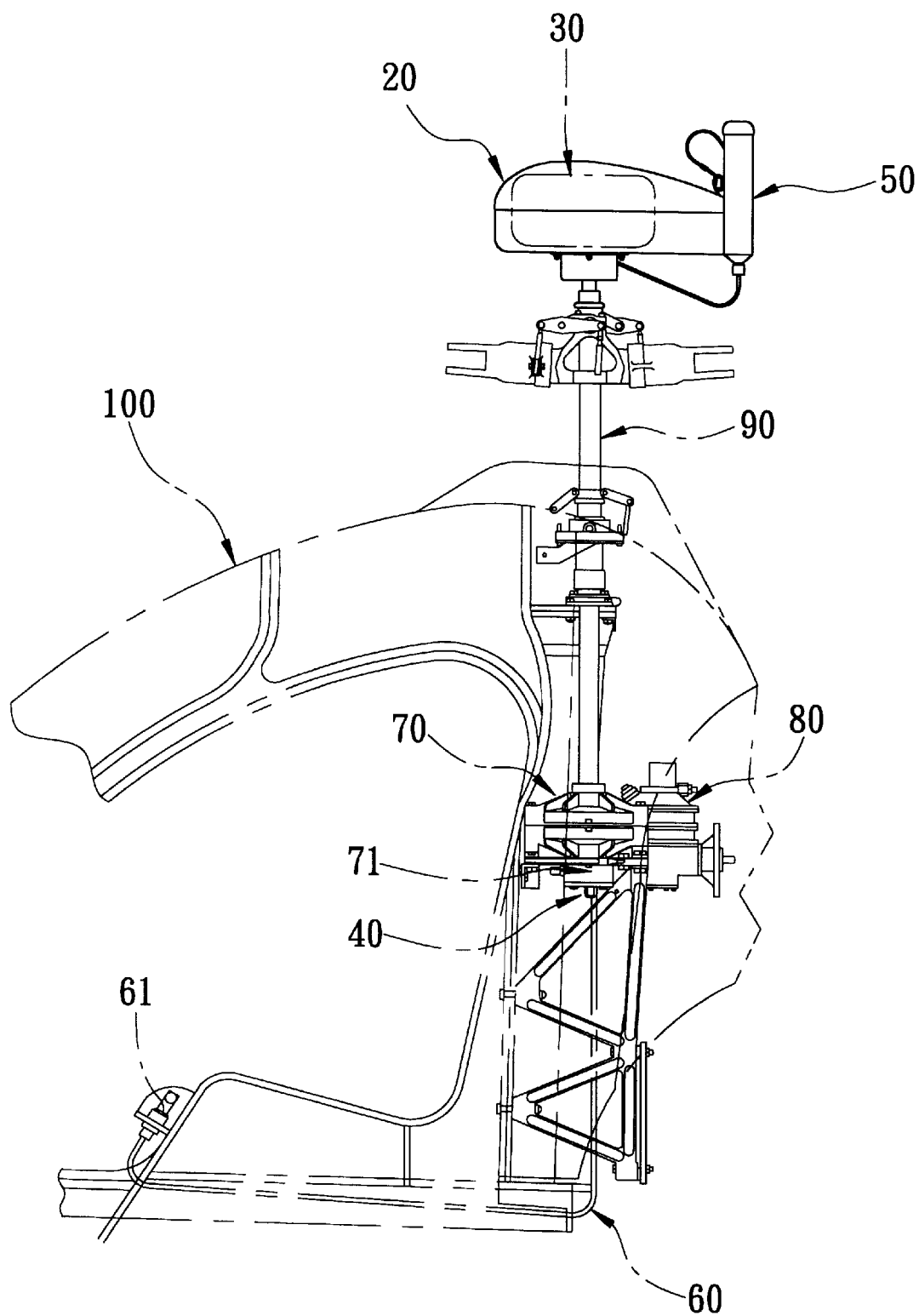
FIG. 1 is a schematic side view of the preferred embodiment of a parachute device according to the present invention, with a portion of a helicopter to which the preferred embodiment is applied illustrated using phantom lines.
Figure 2:
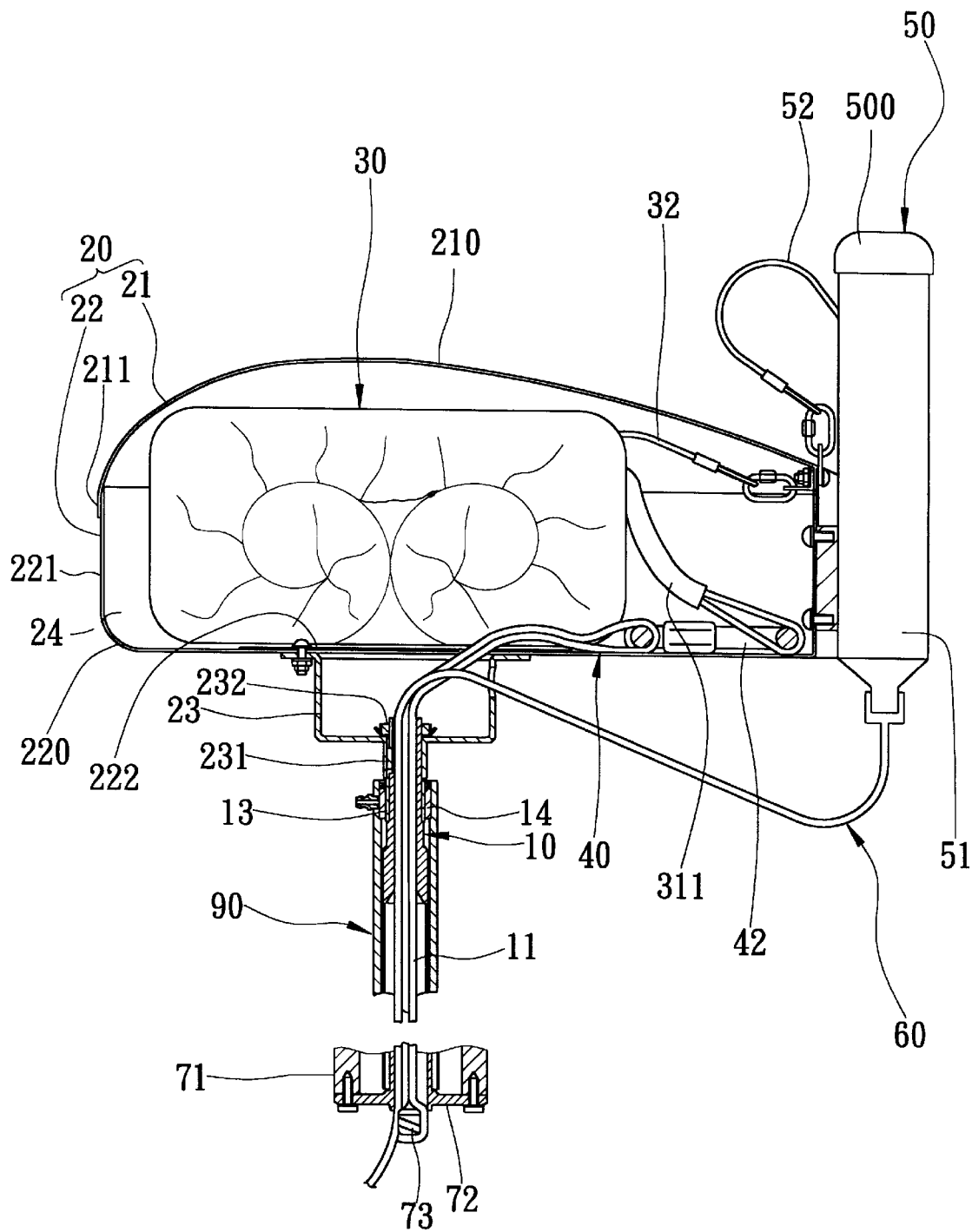
FIG. 2 is a schematic, partly sectional, side view of the preferred embodiment.
Figure 3:
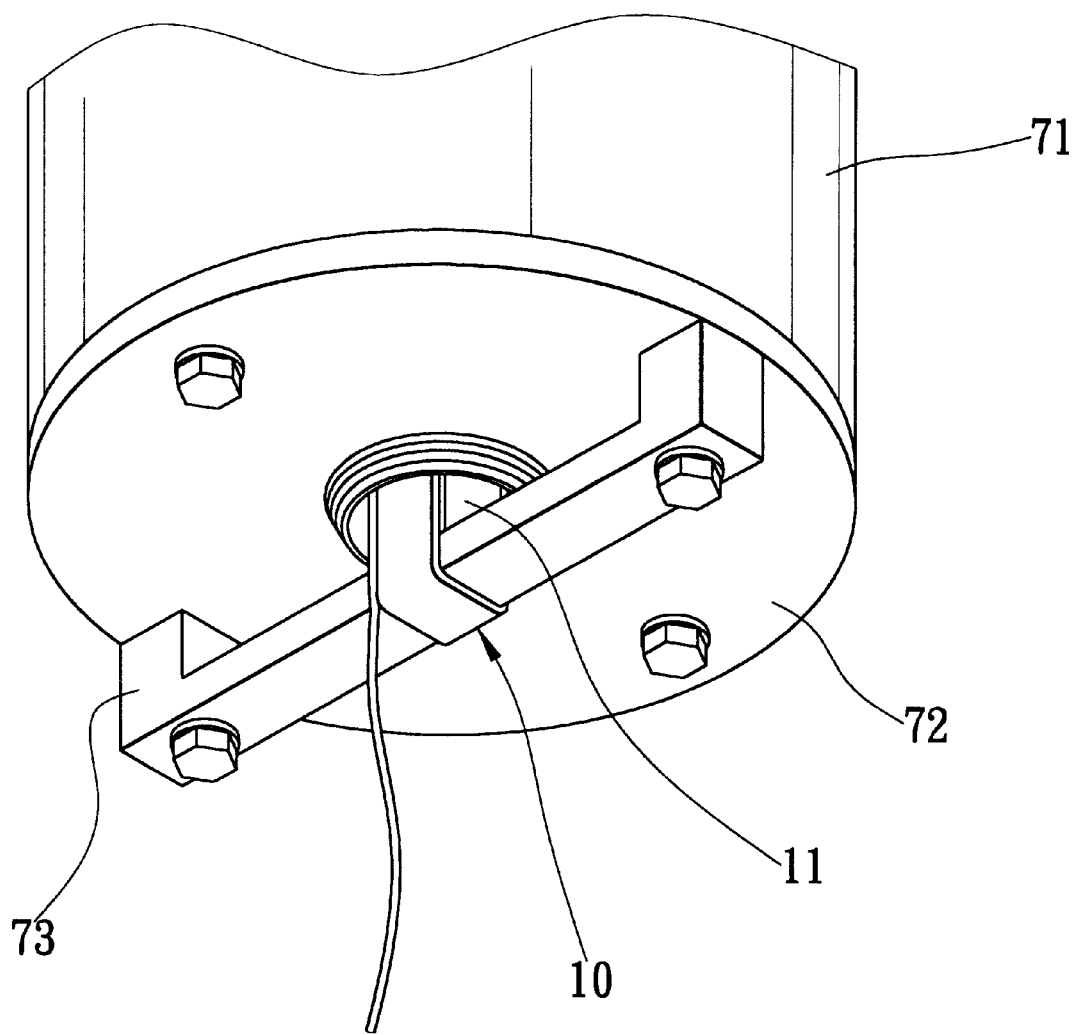
FIG. 3 is a fragmentary bottom perspective view illustrating the connection between the preferred embodiment and a gearbox of the helicopter.

Referring to FIGS. 1 to 4, the preferred embodiment of a parachute device according to the present invention is to be applied to a conventional helicopter 100 having a gearbox 70 which couples an engine 80 to a tubular rotor drive shaft 90. The parachute device comprises an elongate vertical hollow mounting member 10, a canopy confining case 20, a parachute canopy 30, an anchoring line 40, a rocket member 50, and an ignition control line 60.

The mounting member 10 is adapted to be extended rotatably inside the rotor drive shaft 90, and has top and bottom ends and a hole 11 that extends longitudinally through the top and bottom ends. The bottom end of the mounting member 10 is mounted securely on a base plate 72 that is bolted to a bottom portion 71 of the gearbox 70. A sleeve 13 and a bearing 14 are disposed between the mounting member 10 and the rotor drive shaft 90 such that rotation of the rotor drive shaft 90 is not transmitted to the mounting member 10. The top end of the mounting member 10 projects upwardly and outwardly of the rotor drive shaft 90.

The canopy confining case 20 includes a removable casing part 21 and a stationary casing part 22 that cooperate to form a compartment 24. The stationary casing part 22 includes a bottom wall 220 and a surrounding wall 221 that extends upwardly from a periphery of the bottom wall 220 and that defines an open access end of the stationary casing part 22. The removable casing part 21 includes a top wall 210 and a peripheral flange 211 that extends downwardly from a periphery of the top wall 210 and that is sleeved removably on the surrounding wall 221 of the stationary casing part 22 to close the open access end of the latter. The bottom wall 220 of the stationary casing part 22 is mounted securely on top of a hollow base 23. The hollow base 23, in turn, is mounted securely on the top end of the mounting member 10 via a key 231 and a nut 232. Since the top end of the mounting member 10 projects upwardly and outwardly of the rotor drive shaft 90, the canopy confining case 20 is disposed above the rotor drive shaft 90, and does not rotate with the rotor drive shaft 90.

The parachute canopy 30 is received inside the compartment 24 of the canopy confining case 20, and has a release cord 32 connected to the removable casing part 21, and a suspension line unit 311. Since the construction of the parachute canopy 30 is known in the art, a detailed description of the same will be omitted herein for the sake of brevity.

The anchoring line 40 is in a form of a closed loop that extends through the hole 11 in the mounting member 10. One end of the anchoring line 40 is fixed to an anchoring rod 73 on the base plate 72. The other end of the anchoring line 40 extends into the canopy confining case 20 via the hollow base 23 and an opening 222 in the bottom wall 220 of the stationary casing part 22, and is provided with a connecting link 42 for coupling with the suspension line unit 311 of the parachute canopy 30.

The rocket member 50 includes an upright launch tube 51 that is mounted securely on an outer wall surface of the surrounding wall 221 of the stationary casing part 22 so as to be disposed externally of the compartment 24, and a rocket 500 disposed in the launch tube 51 and connected to the removable casing part 21 via a cable 52. The rocket 500 of the rocket member 50, which is conventional in construction, is capable of propelling from the launch tube 51 when ignited.

The ignition control line 60 extends through the hole 11 in the mounting member 10 and the hollow base 23, and has a first end connected to the rocket member 50 at a bottom end of the launch tube 51, and a second end disposed inside the passenger room of the helicopter 100 and provided with an ignition unit 61 that is operable so as to ignite the rocket 500 in a known manner.

Figure 4:
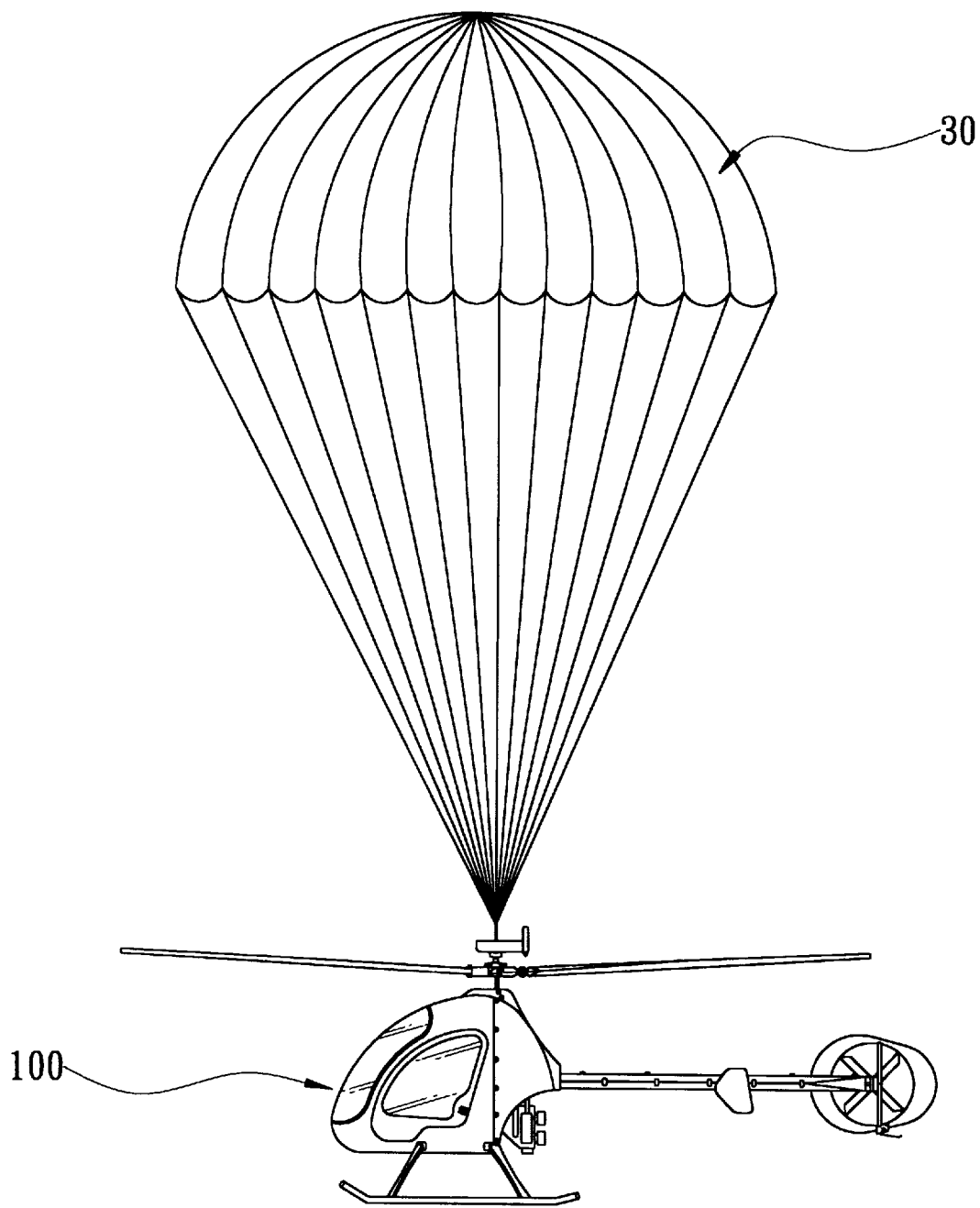
FIG. 4 illustrates how the preferred embodiment assists in the safe landing of a helicopter.

In case of an emergency situation, such as power loss or breakdown while the helicopter 100 is in flight, the pilot of the helicopter 100 can operate the ignition unit 61 to ignite the rocket 500. Once ignited, the rocket 500 will propel from the launch tube 51. Because the rocket 500 is connected to the removable casing part 21 via the cable 52, the removable casing part 21 will be removed from the stationary casing part 22. Furthermore, since the parachute canopy 30 is connected to the removable casing part 21 via the release cord 32, the parachute canopy 30 will open due to a pulling force applied by the removable casing part 21 on the release cord 32 when the removable casing part 21 moves with the rocket 500 away from the stationary casing part 22. Because the suspension line unit 311 of the parachute canopy 30 is connected to the helicopter 100 via the anchoring line 40, the parachute canopy 30 can support the weight of the helicopter 100 and assist in safe landing of the same to prevent destruction of property and loss of lives, as shown in FIG. 4.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A parachute device for a helicopter having a tubular rotor drive shaft, said parachute device comprising:

an elongate hollow mounting member having top and bottom ends, and a hole that extends longitudinally through said top and bottom ends, said bottom end of said mounting member being adapted to be mounted securely to the helicopter, said mounting member being adapted to be extended rotatably inside the rotor drive shaft such that said top end of said mounting member projects upwardly and outwardly of the rotor drive shaft;

a canopy confining case having a stationary casing part mounted securely on said top end of said mounting member, and a removable casing part mounted removably on said stationary casing part, said stationary and removable casing parts cooperatively forming a compartment;

a parachute canopy received inside said compartment of said canopy confining case, said parachute canopy having a release cord connected to said removable casing part, and a suspension line unit;

an anchoring line extending through said hole in said mounting member and having a first end that is adapted to be fixed to the helicopter and a second end that extends into said canopy confining case and that is coupled to said suspension line unit of said parachute canopy;

a rocket member including a launch tube mounted on said stationary casing part externally of said compartment, and a rocket disposed in said launch tube and connected to said removable casing part, said rocket being capable of propelling from said launch tube when ignited; and an ignition control line extending through said hole in said mounting member and having a first end connected to said rocket member and a second end provided with an ignition unit that is operable so as to ignite said rocket;

whereby, when said rocket propels from said launch tube, said removable casing part will be removed from said stationary casing part, thereby allowing said removable casing part to pull said release cord and open said parachute canopy, said parachute canopy being adapted to support weight of the helicopter when opened via said anchoring line that interconnects said suspension line unit of said parachute canopy and the helicopter.

2. The parachute device as claimed in claim 1, wherein:

said stationary casing part includes a bottom wall secured to said top end of said mounting member, and a surrounding wall that extends upwardly from a periphery of said bottom wall and that defines an open access end of said stationary casing part, said surrounding wall having an outer wall surface with said launch tube mounted securely thereon; and said removable casing part includes a top wall and a peripheral flange that extends downwardly from a periphery of said top wall and that is sleeved removably on said surrounding wall of said stationary casing part to close said open access end.

3. The parachute device as claimed in claim 1, wherein said second end of said anchoring line is provided with a connecting link for coupling with said suspension line unit of said parachute canopy.

4. The parachute device as claimed in claim 1, wherein said rocket is provided with a cable for connection with said removable casing part.

* * * * *